March 8, 1932. G. DELPECH 1,848,940
APPARATUS FOR THE BLOWING AND MOLDING OF ARTICLES IN SILICA GLASS
Filed Dec. 1, 1926
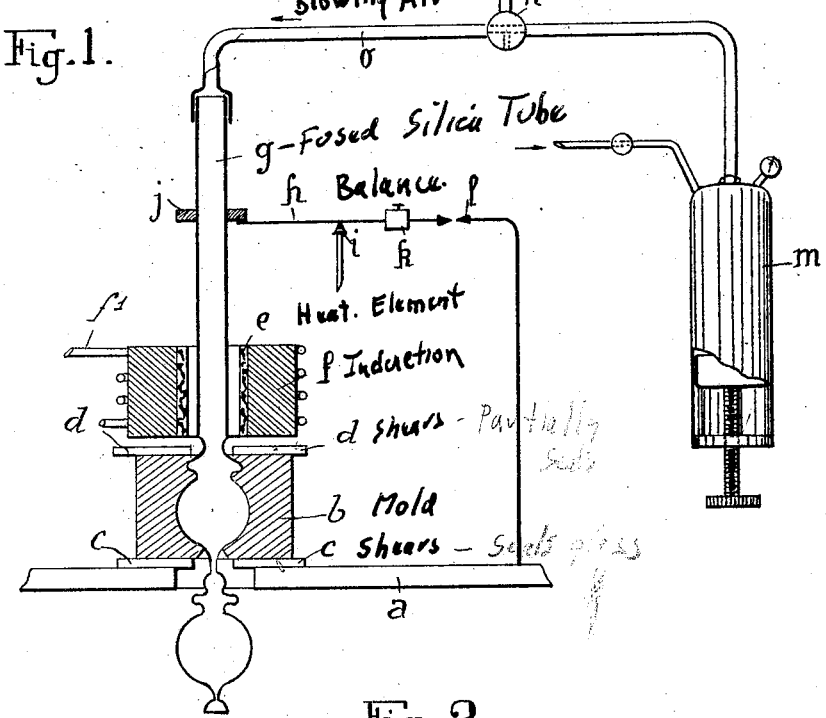
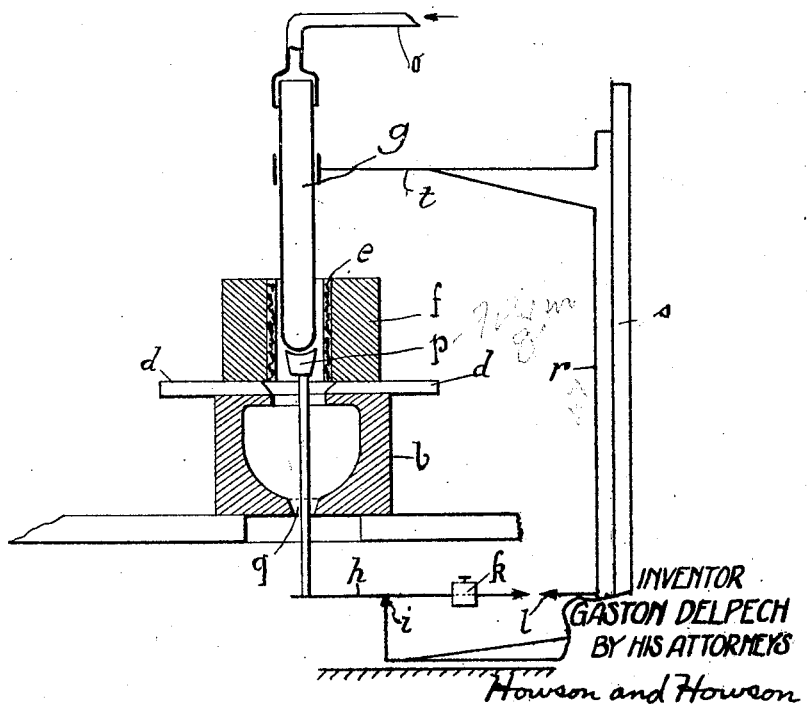
INVENTOR
GASTON DELPECH
BY HIS ATTORNEYS
Howson and Howson Patented Mar. 8, 1932

1,848,940

UNITED STATES PATENT OFFICE

GASTON DELPECH, OF NEMOURS, FRANCE, ASSIGNOR TO SOCIÉTÉ QUARTZ & SILICE, OF PARIS, FRANCE, A CORPORATION OF FRANCE

APPARATUS FOR THE BLOWING AND MOLDING OF ARTICLES IN SILICA GLASS

Application filed December 1, 1926, Serial No. 152,022, and in France December 29, 1925.

The present invention relates to machines for use in connection with the blowing and molding of articles in silica glass, or in any other glass having a high content in silica.

An object of the invention is to provide for step by step heating, in a furnace, and to a degree suitable for blowing, of successively disposed portions of a previously fused tubular blank of silica, and to effect, without detachment, transfer of the heated portion of the blank from the furnace into a mold, wherein the said heated portion may be blown to its final shape while the next succeeding portion of the blank is within the furnace and being heated.

In the case of silica glass, there is obtained in this apparatus a perfect vitrification, both external and internal, and there are obtained at will, according to the nature of the blank or the finish of the surface, articles of an opaque, translucent, transparent or silvered appearance, these articles presenting on their outer sides great precision of the order of 1/20 millimetre. These advantages are obtained directly in the molding, without it being necessary, as in the customary processes, to have recourse to the machining of the articles by mechanical means or to their superficial vitrification by means of the arc or the blow pipe.

The annexed drawings represent, by way of example only and in a more or less diagrammatical manner, in vertical section, two forms of construction of an apparatus according to the invention.

Figure 1 is a view partly in section and in diagrammatic form of one embodiment of the invention.

Figure 2 is a view similar to Fig. 1 of a modified form of the invention.

In the example of construction according to Figure 1, upon the table $a$ there rests the mold $b$, which carries at its lower end a shears $c$ constituted by two plates adapted to be brought together until coming into contact. At the top of the mold there is placed a similar shears $d$, which effects only a partial closure. Above the mold is placed the tubular furnace $f$ of which $e$ is the heating element, raised to high temperature by high frequency induction; around the furnace $f$ is arranged a helical winding $f^1$ traversed by an alternating current of high frequency produced by any suitable known means. The blank which consists of a relatively long tubular piece $g$ of fused silica obtained in a previous operation, is connected to one arm of a balance beam $h$, resting upon a knife edge $i$, by means of a collar $j$, fixed upon the blank $g$; a movable counterweight $k$, placed upon the opposite arm of the beam, maintains the balance in a state of equilibrium. The beam can move in front of the index mark $l$. The blank is connected to a reservoir of compressed air $m$, of adjustable capacity, by a flexible pipe $o$, provided with a three-way cock $n$, allowing also the discharge of the gas to the atmosphere.

The operation of this apparatus is as follows: For the first molding operation, the operator directly observes the elongation of the tube to determine the suitable moment for molding. Starting from the instant at which an article is molded, the tubular blank $g$ is fixed to the mold by this first article. The balance beam $h$ previously brought opposite its index mark $l$ by displacing the counterweight $k$, will move relatively to this index mark only at the moment when the new length or section of the tubular blank $g$, heated in the furnace $f$, has become sufficiently plastic to be deformed under the action of the weight of the blank $g$, or of the mass $k$; the balance can be adjusted to provide for the preponderance of either one or the other as preferred. This instant corresponds to the softening which is propitious for the molding operation. At this moment, the operator effects the descent of the blank into the mold $b$ sufficiently to permit the desired length of blank to pass from the furnace $f$ into the mold $b$. The operator subsequently squeezes together and completely closes the lower extremity of the blank at the base of the mold $b$, by means of the shears $c$, and admits, by means of the cock $n$, compressed air to the interior of the blank, which assumes exactly the form of the mold. The shears $d$ is actuated at the same time as the shears $c$; it effects only a partial closing of the blank, but squeezes it sufficiently to allow by breakage the ready separation of the molded articles.

During the operation of molding and removing from the mold, a fresh section of the blank comes into the furnace $f$ in such a way that the process thus ensures continuity of the operations.

In the modification represented in Figure 2, the arrangement of the whole apparatus remains the same, but the beam $h$ is arranged under the mold and supports in equilibrium the member $p$, which is in contact with the lower end of the tube $g$, the softening of which is indicated as in the preceding case by the tilting of the beam $h$. Moreover, this member $p$ is arranged in such a way that it can complete the lower part of the mold $b$ by fitting into the opening $q$ of the latter, with a view to obtaining closed articles, such as crucibles for example. In this case, the shears $d$ has for its function to close and cut off the tube before its introduction into the mold, and the operation of molding is effected with two re-heatings. A support $s$ carries a bracket $r$ having an arm $t$ which supports the tubular blank in the furnace and an arm which supports the knife edge $i$. The index mark $l$ is carried by the bracket $r$. Bracket $r$ and its arms may be moved for advancing the heated portion of the blank from the furnace to the mold $b$.

As a modification of this second method, it is possible to blow balloons or articles of spherical shape, without employing molds, by blowing in the free air, in the manner of glass-blowers.

The articles obtained by the process according to the invention present appearances differing according to the nature of the blank employed in their manufacture; this blank may be for example transparent or opaque; in the latter case, the blank may be rough that is to say, present the known rough surfaces of opaque silica articles, or else be first of all glazed by superficial re-melting, or machined or polished mechanically. It is likewise possible to obtain different appearances of the articles by varying either the speed of heating or the temperature of molding. For example, the giving way of the blank can be retarded by the action of a suitable counterweight.

For the simplicity of the explanation, the successive operations of the process have been described as clearly separate. It is evident, however, that the displacement of equilibrium of the device controlling the softening of the blank can be employed in order to control automatically the downward movement of the blank, the admission of compressed air to the interior of the latter, and all the other operations. It will likewise be understood that the process ensures continuity of manufacture, the operation of molding of a section of the blank taking place during the heating of the succeeding section of the blank.

The device employed for the heating of the furnace may be of any kind; there can be utilized one or more oxyhydrogen blowpipes; it is, however, preferable to utilize a heating element of tubular shape (for example of graphite or amorphous carbon), raised to high temperature by the passage of an electric current and suitably lagged. The best results are obtained, both from the point of view of output and of simplicity of construction, by placing the heating element in a field of high frequency, in such a way as to raise its temperature by induction, in this mass, of very intense currents.

The molds employed may be formed of any material adapted to stand the heating and presenting an expansion compatible with the shape of the articles. Thus there may be employed all metals and alloys specially utilized for the molds of glass ware, as well as nickel, graphite or any other material.

There can be combined, with the apparatus according to the invention, a spark gap and an oscillating circuit, allowing of transforming the normal supply current into a high frequency current, in such a way as to make of the apparatus a complete self-contained manufacturing unit.

What I claim is:

1. An apparatus for the consecutive blowing and molding of a series of tubular articles in glass having a high content in silica, comprising a furnace adapted to receive a section of a tubular body of silica fused in a previous operation, and to heat the same therein, a mold arranged immediately below the furnace and adapted to receive the said section directly upon removal thereof from the furnace means for blowing in said mold the said softened section of the tubular body, and means for controlling the degree of softening of the said section within the furnace and means for allowing said softened section to drop into the mold.

2. An apparatus for the consecutive blowing and molding of a series of tubular articles in glass having a high content in silica, comprising a furnace adapted to receive a section of a tubular body of silica fused in a previous operation, and to heat the same therein a mold arranged immediately below the furnace and adapted to receive the said section directly upon removal thereof from the furnace, means for blowing in said mold the said softened section of the tubular body, and a balance beam having one arm connected to the tubular body of silica above the furnace and the other arm weighted by a movable counterweight and adapted to move in front of an index mark when the softened section of the blank is deformed, for the purpose described.

3. An apparatus for the consecutive blowing and molding of a series of tubular articles in glass having a high content in silica comprising a furnace adapted to receive a section of a tubular body of silica fused in a previous operation, and to heat the same therein, a mold arranged immediately adjacent to the furnace and adapted to receive the said section directly upon removal thereof from the furnace, means for blowing in said mold the said softened section of tubular body, together with a pliers consisting of two plates adapted to be brought together so as to partially constrict a portion of softened tubular section extending between the heating furnace and the mold and a similar pliers for completely closing another portion of the tubular portion of the section spaced from the partially constricted portion.

4. An apparatus for the consecutive blowing and molding of a series of tubular articles in glass having a high content in silica, comprising a furnace adapted to receive a section of a tubular body of silica fused in a previous operation and to heat the same therein, a mold arranged immediately adjacent to the furnace and adapted to receive the said section directly upon removal thereof from the furnace, means for blowing in said mold the said softened section, said blowing means including a pressure accommulating reservoir, means for varying the capacity thereof according to the volume of the article to be blown and for diminishing the pressure during the molding, a pipe connecting said pressure reservoir to the tubular body and valve means connected to said pipe allowing the passage of gas from the article after molding.

5. An apparatus for the consecutive blowing and molding of a series of tubular articles in glass having a high content in silica, comprising a furnace adapted to receive a section of a tubular body of silica fused in a previous operation, and to heat the same therein, a mold arranged immediately below the furnace and adapted to receive the said section directly upon removal thereof from the furnace means for blowing in said mold the said softened section of the tubular body, and means for controlling the degree of softening of the said section within the furnace.

In testimony whereof I have signed my name to this specification.

GASTON DELPECH.